F. T. THOMPSON.
PROCESS OF MAKING ELECTROTYPE PLATES OR METALLIC SHELLS.
APPLICATION FILED AUG. 4, 1916.
1,210,872.
Patented Jan. 2, 1917.
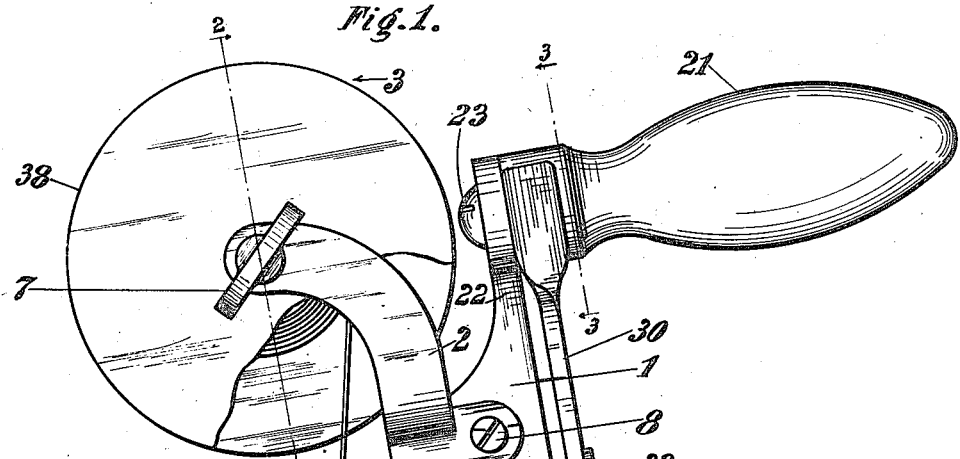
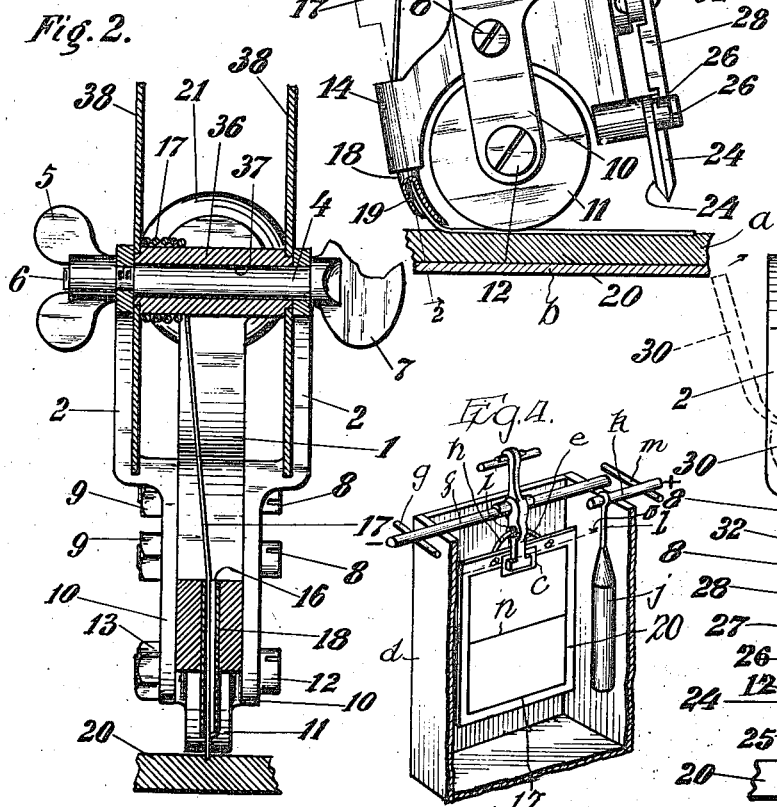
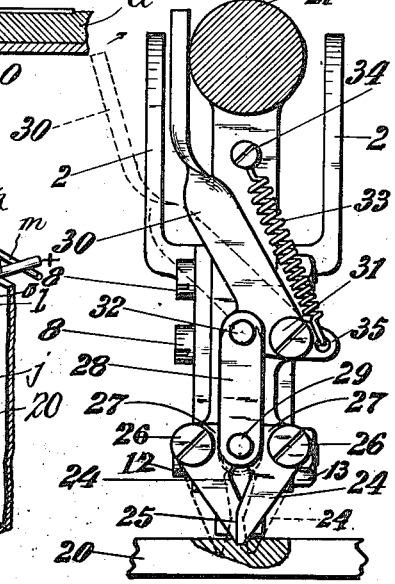
WITNESSES:
Louis L. Korach
David N. Fletcher
INVENTOR.
Frank T. Thompson
BY Harry Irwin Cromer
ATTORNEY

UNITED STATES PATENT OFFICE.

FRANK T. THOMPSON, OF CHICAGO, ILLINOIS.

PROCESS OF MAKING ELECTROTYPE-PLATES OR METALLIC SHELLS.

1,210,872.　　　　　Specification of Letters Patent.　　Patented Jan. 2, 1917.

Application filed August 4, 1916. Serial No. 113,144.

*To all whom it may concern:*

Be it known that I, FRANK T. THOMPSON, a citizen of the United States, residing in Chicago, in the county of Cook and State of Illinois, have invented certain new and useful Improvements in Processes of Making Electrotype-Plates or Metallic Shells, of which the following is a specification.

This invention relates to an improved process for making electrotype plates or metallic shells.

The principal object of the invention is to provide an improved process for making shells for electrotype plates.

Other and further objects of the invention will appear from the following description and claims, and from an inspection of the accompanying drawings, which are made a part of this specification.

The invention consists in the features, combinations, parts and details of construction, and in the process herein described and claimed.

In the accompanying drawings, Figure 1 is a view in side elevation of a machine constructed in accordance with my invention and improvements, with a portion of the removable wire-supporting spool or reel broken away, with the pressing roller in engagement with a wire in the operation of embedding the wire in an electrotype mold, and with the wire cutter mechanism in raised position and out of engagement with the wire; Fig. 2, a view in transverse, approximately vertical section, taken on line 2 of Fig. 1, looking in the direction of the arrow; Fig. 3, a view in elevation showing the operating handle in transverse section, taken on line 3 of Fig. 1, looking in the direction of the arrow,—the wire cutter mechanism being shown in full lines in lowered operative position, with the blades closed, and with the blades shown in broken lines in open position, and the wire spool removed, and Fig. 4 a diagrammatic view showing an electrotype mold suspended in a solution in a depositing tank and in circuit with a source of electric energy, for depositing metal upon the electrically conductive surface of the mold.

In constructing a machine for laying or embedding metallic strips or wire in electrotype molds or plastic material in accordance with my invention and improvements, I provide a main frame 1, having forked arms 2 thereon, and which may be integral with the main frame if desired. These arms project upward on opposite sides of the main frame, and, by preference, forward, and are adapted to form a support for a spool or reel 3 which is rotatively and, by preference, removably mounted between the spool-supporting arms 2, and there supported by means of a transverse bolt or spindle 4 which extends through the axial center of the spool and through suitable apertures in the arms 2. A nut 5 having a head or knob 7, is mounted in threaded engagement with the threaded end 6 of the bolt or spindle. The wire-supporting spool 3 comprises in its construction a central body portion 36 having an axial opening 37 through which the bolt 4 extends, the opposite ends of the bolt being removably supported by the arms 2 already described. And side plates or disks 38 are mounted upon opposite ends or extremities of the main body, hub or spindle member 36, so as to support the wire or strip 17 in position when wound upon the spool. The main body or hub 36 of the spool may be made of wood or metal, and the end members 38 of pasteboard or other similar or suitable inexpensive material. Spools thus made are adapted to be used interchangeably, and readily removed and replaced or substituted one for the other, and removably secured in position on the main frame or between the forks or arms 2 of the device. The supporting arms 2 are adapted to be securely held or pressed into sufficiently snug frictional engagement with the spool by means of the bolt 4 and nut 5 so as to permit, but yieldingly or frictionally resist, the rotation of the spool and cause the wire 17 to be held taut when it is being unwound from the spool. The spool is thus prevented from rotating so freely as to permit the wire to become slack or to become entangled or so loose as to interfere with the efficient operation of the device. The spool or reel supporting arms 2 are supported by, and by preference secured to the frame portion 1 by means of screws or bolts 8 and nuts 9, or similar suitable securing means. A pair of depending arms 10 extend downward on opposite sides of the center or lower portion of the main frame member 1. Each depending arm 10 is, by preference, integral with the corresponding spool-supporting or reel-supporting arm member or fork member 2. It will be readily understood by those skilled in the art that the fork members 2, and depending arm members 10 may be integral with and form a part of the main frame portion 1 to which they are rigidly secured. A pressing roller or wire laying wheel 11 is rotatively mounted between the depending arms 10, and rotatively supported in position by means of a headed bolt or spindle 12, which extends through suitable apertures in the lower end of the depending arms and through the axial center of the pressing wheel 11, and transversely with respect to the device and the direction of movement of the machine when in operation. The bolt or spindle 12 is adapted to be secured in operative position by means of a nut 13 upon the threaded end thereof, or by similar or other suitable securing means.

A wire guide, which is, by preference, in the form of a depending arm 14, having a wire engaging portion or slot 16 for engaging and guiding a strip or wire 17 to be operated upon, extends downward in front of the pressing roller or wire-laying wheel 11, and is, by preference, provided with a hollow or tubular wire engaging bottom portion, or member 18, having an aperture 19 through which the wire extends. The wire wound upon the spool 3 passes from the spool through said guide and downward in position to rest upon the surface of the electrotype mold, or similar article formed of plastic or wax-like material 20 in position to be engaged by the bottom peripheral surface of the pressing roller or wire-laying wheel 11, and pressed inward or embedded in the mold or article 20, but with the upper surface of the strap or wire exposed at or slightly above the top or outer surface of such mold. An operating handle 21 is secured upon the upper portion 22 of the main frame 1, by means of a bolt or screw 23 or other suitable securing means.

Suitable wire cutting mechanism is provided adapted to enable the metallic or electrically conductive strip or wire 17 to be cut or severed, by preference, while the wire is in contact with and embedded or partially embedded in the plastic material of which the mold or article 20 is formed. This cutter mechanism when constructed, as shown in the drawings, comprises a pair of cutter jaws or blades 24 having their inner cutting-edges 25 in position to be moved toward and from and in sliding overlapping or operative engagement with each other, so as to operate in the manner of a pair of shears. The points of the blades 24 extend downward, and are, by preference, pivotally supported in operative position upon the main frame 1 by means of horizontal pivots 26 which are anchored in the main frame and extended through suitable apertures in said blades. Each blade 24 is provided with an inwardly extending operating lever 27 in fixed relation to or integral with and arranged at an angle with respect to the corresponding blade 24, each of said levers having its inner end portion pivotally connected with an operating link 28 by means of a horizontal pivot 29 which extends through the lower extremity of said link, and through the lever portions 27 of the blades or cutter jaw members 24. A cutter-operating lever 30 is pivotally mounted upon the main frame by means of a suitable pivot or headed bolt 31, and operatively connected with the upper extremity of the link 28 by means of a pivot 32, which extends through a suitable aperture in the link, and is secured to the lever so as to form a pivotal connection between the link and lever. A spring 33, having one end connected with the main frame by means of a pin 34 or other suitable securing means, is operatively connected with an arm 35 of the lever 30 and tends to move the lever 30 from cutter closing position or the position in which it is shown in full lines in Fig. 3, to the position in which it is shown in broken lines in said figure, thereby causing the cutter jaws 24 to be moved from closed or wire cutting position,—in which they are shown in full lines in Fig. 3,—to open position in which they are shown in broken lines in said figure. The cutter jaws are thus adapted to be yieldingly held in open position by the action of the spring 33. The operating lever 30 is adapted to be pressed by the operator from the position in which said lever is shown in broken lines in Fig. 3—or cutter-opening position—to the position in which said lever is shown in full lines in said figure, thereby forcing the cutter jaws 24 together or toward and in wire-cutting engagement with each other and with the wire, or from the position in which they are shown in broken lines to the closed or wire cutting position in which said jaws are shown in full lines in said figure.

In operation the strip or wire to be operated upon is placed upon or in contact with the surface of the electrotype mold or plastic material or article upon or in which the wire is to be laid or embedded, and the pressing roller or wheel 11 is pressed downward upon the strip or wire, and the entire device while held in the position indicated in Fig. 1, is moved forward so as to cause the pressing roller 11 to engage and roll upon the wire in the direction of movement of the device, the wire being guided by the wire guiding member 14 as it is unwound from the rotating spool or reel 3, and caused to pass downward in front of and beneath the wheel 11, so as to be pressed downward by the latter as the pressing roller passes along and in engagement with the wire progressively from end to end, or longitudinally thereof. The wire is thus embedded in the plastic material of which the electrotype mold, or article 20, is formed. When the desired amount of wire has thus been laid upon or embedded in the article, the wire cutter jaws 24 are then lowered into position to extend on opposite sides of the wire, at a point rearward with respect to the pressing roller, and the wire cutter lever 30 is pressed in the direction necessary to force the cutter jaws together and into cutting engagement with the wire. The wire is thus severed while held down by the pressing roller, and in such a manner that the wire embedded in the plastic material back of the pressing roller and cutter is not disturbed.

In practising my improved process of making electrotype plates I provide one or any desired number of electrotype molds, matrices, or cases 20, each of which is formed of a sheet or layer $a$ of suitable plastic or wax-like material or composition such as beeswax, white pine turpentine and plumbago in suitable proportions, or a material which is commonly known in commerce as "ozocerite" and is a waxy residue of petroleum. Ozocerite may be intermixed with a suitable quantity of petroletum or vaseline in case the ozocerite alone becomes harder than is desired. In practice a composition containing a half ounce of petroletum intermixed with each pound of ozocerite has been found very satisfactory. A very satisfactory wax composition consists of beeswax, stearic acid, turpentine and plumbago, in approximately the following proportions: ten pounds of beeswax, twelve ounces of stearic acid, one pound of white pine turpentine and four ounces of plumbago. The plastic, or wax-like material is melted by being heated to a suitable temperature, and, while hot and in a fluid or molten condition, is poured upon or into a case, mold pan or flanged metallic plate $b$ and allowed to set and cool until sufficiently hard to be properly trimmed and shaved, but sufficiently plastic to receive the impression of the types, engraving, or characters, the counterparts of which are to be produced upon the shell and finished electrotype plate or plates, and to retain the impression after the types or form for making the impression in the matrix or wax-like material has been removed. The impression of the types, engraving or characters in the form to be used for the purpose, having been made by means of an ordinary or suitable press forcing the type faces into the wax-like material in the ordinary manner familiar and well known and in common practice in the art, the mold is trimmed, and a fine metallic wire 17 is laid in the plastic material of which the mold is formed, while said material is still in a sufficiently plastic condition to enable the wire to be embedded therein with facility and in an efficient manner. The wire is so laid as to extend along opposite marginal portions of the molding surface of the mold upon which metal is to be deposited, and is, by preference, in the form of a loop or loops within which said molding surface is embraced. A metallic contact plate $c$ is also partially embedded in and is adhesively secured in contact with the plastic or wax-like material of which the mold or matrix is formed, and in contact with or closely adjacent to the wire 17 at or near the margin of the mold or matrix, so that the contact plate and the wire 17, and any wire such for instance as the wire $n$ which may be connected or laid in contact with the wire 17, form an electric circuit. The mold or matrix is then blackleaded, or provided with a coating or film of electrically conductive material, which may consist of black lead. This coating of black lead or electrically conductive material covers the molding surface of the mold or matrix upon which metal is to be deposited, and renders the surface of the mold thus covered electrically conductive, and the coating is in contact at its opposite margins, and by preference, at all of its margins, with the metallic wire. The wire 17 is of somewhat greater electrical conductivity than the coating of black lead with opposite margins of which the wire is in contact, and the contact plate $c$ is also of greater electrical conductivity than said coating. The importance of the marginal electric circuit on opposite sides of and in contact with and by preference surrounding the electrically conductive surface of the mold upon which metal is to be deposited, and the desirability of said marginal or wire conductor being of greater conductivity than the coating are readily apparent in view of the advantages hereinafter set forth. The wire thus laid, extends around an electrically conductive surface portion of the matrix from points closely adjacent to or in contact with the contact plate $c$. The wire or wires and contact plate thus operatively connected and embedded in the wax-like portion of the mold and out of contact with the metallic back of the mold are connected with a dynamo or source of electric energy, and the mold is suspended in a tank in a suitable solution or electrolytic bath containing a suitable anode. The wire or wires may be laid in the form of one or more loops so as to be embraced in the same electric circuit with the contact plate, and the wire or wires and the contact plate thus form an electric circuit which is insulated from the metallic back of the mold by the wax-like material, and is in contact with opposite marginal portions of an electrically conductive surface of the mold upon which surface metal is to be deposited to form a metallic shell of an electrotype plate or plates. The wire or wires are, by preference laid around the marginal portion of the case or mold outside the "bearers" so as to embrace the entire surface to be covered by depositing metal thereon, the black lead coating outside the wire and wire-encircled portion of the mold being removed so as to render the outer marginal portions of the mold non-conductive.

The depositing solution $o$ may, of course, be of any desired suitable ordinary and well known form adapted to be used in the process or operation of depositing the desired metal upon the mold or matrix to form a shell of an electrotype plate, and is placed in a suitable lead-lined wooden depositing tank $d$ of any desired well known form. When copper is to be deposited to form the electrotype shell, the solution may consist of or comprise sulfate of copper, sulfuric acid and water in suitable quantities and proportions; and when nickel is to be deposited a different solution from that above suggested would of course be used, such for instance, as a solution consisting of or containing nickel sulfate, water and ammonium sulfate in suitable quantities and proportions, the nickel sulfate being dissolved in hot water to the point of saturation and allowed to cool, all of which is familiar and well known and common practice in the art to which this invention relates, and is therefore believed to require no further description herein.

The mold with the wire 17 and contact plate $c$ embedded in the wax-like material, and with the surface of the wire and contact plate exposed above or approximately flush with the surface of the mold, is suspended in the tank $d$ in the desired depositing solution, as already suggested, in such a manner that the entire surface portion of the mold or matrix is covered by the solution, and the contact plate $c$ and wire 17 are also beneath the surface of the solution; and the contact plate $c$ is connected with a suitable source of electric energy, such as a dynamo—not shown—by means of a connecting and supporting mechanism which may be of any desired suitable or ordinary and well known form, such, for instance, as a supporting and connecting clamp or member $e$ the lower extremity of which is in contact with the contact plate $c$, and the upper portion of which is in contact with and adapted to be supported by a connecting or contact rod $f$ which is in contact with a connecting rod $g$, all of metal and adapted to be connected with one of the poles, for instance, the negative pole of a dynamo. A hook $h$ is hooked into one or more suitable perforations in the case or mold, and is supported by the metallic member $e$, suitable insulating material $i$ being interposed between the parts $e$ and $h$. An anode $j$ of copper or nickel or any desired metal to be deposited on the surface of the mold, is suspended in the solution, and suitable means is provided for connecting the anode with the opposite or positive pole of the dynamo. This connecting means may comprise a metallic rod $k$ in supporting engagement with a metallic hook $l$ on the anode, and a metallic rod $m$ is mounted in contact and supporting engagement with the rod $k$ and adapted to be connected with the dynamo.

When desired, a wire $n$ may be laid in contact with the wire 17 and across and in contact with the wax-like material of which the mold or matrix is formed, said wire $n$ being embedded in the plastic or wax-like material in the same manner in which the wire 17 is laid.

From the foregoing it will be seen that the electric current will pass from the anode through the depositing solution to the surface of the mold or matrix, and will follow the wire 17 or wires 17 and $n$, when a plurality of connected wires are employed, and cause metal to be deposited along and throughout the length of the wire or wires and in such a manner that the metal deposited will spread from each and every margin of the surface portion of the mold upon which metal is to be deposited toward the central surface portion of the mold, or inward from the opposite marginal portions toward the central surface portion of the mold from all directions simultaneously. The surface of the mold is thus caused to be covered with the deposited metal for forming the electrotype shell quickly, and in such a manner that the metal shell will be of very uniform thickness along all of its margins, the marginal portions being somewhat thicker than the central portion, and therefore well adapted to withstand the excessive wear to which the marginal portions are subjected in use, as compared with the central portion. The necessity for using iron filings or blue stone or similar expedients for rendering the surface of the mold sufficiently conductive is dispensed with. A harder, smoother and better printing surface is thus obtained which is free from the defects which accompany the use of iron filings, than can be produced by any known process wherein iron filings or a coating or means for rendering the surface of the mold conductive, other than as herein set forth, is used. The electrotype or metallic shell of the desired thickness having been formed in the manner described, the metallic shell thus formed is then removed from the mold and filled or backed with metal and trimmed and mounted in the ordinary manner well known and in common practice in the art, and which it is therefore deemed unnecessary to further describe herein.

I claim:

1. The process of making electrotype plates or shells of the class described which comprises making a mold formed of plastic material, laying a metallic electric conductor in contact with and in position to extend along opposite marginal portions of the molding surface of the mold and out of contact with the back of the mold, covering the molding surface of the mold with a coating of electrically conductive material in contact with said first mentioned conductor, and placing the mold in an electrolytic solution and in circuit with a source of electrical energy, whereby metal is caused to be deposited upon opposite marginal portions of the surface of the mold simultaneously and caused to spread over the surface from opposite directions.

2. The process of making electrotype plates or shells of the class described which comprises making a mold formed of plastic material, laying a metallic wire in contact with and in position to extend along opposite marginal portions of the surface of the mold, covering the molding surface of the mold with a coating of electrically conductive material having opposite marginal portions of said coating in contact with said wire, and placing the mold with the electrically conductive coating and wire thereon, in an electrolytic solution, whereby metal is caused to be deposited upon opposite marginal portions of said electrically conductive surface of the mold simultaneously and caused to spread inward over the surface of the mold from opposite directions.

3. The process of making electrotype plates or shells of the class described which comprises making a mold formed of plastic material upon which metal is to be deposited, laying an electrically conductive wire in the plastic material in position to extend along opposite marginal portions of and in contact with and in position to substantially encircle a surface portion of the mold upon which metal is to be deposited, covering the molding surface of the mold with a coating of electrically conductive material having opposite marginal portions in contact with said wire, the wire being of greater electrical conductivity than said coating, and placing the mold in an electrolytic solution and in circuit with a source of electrical energy, whereby metal is deposited on opposite margins of the mold simultaneously and caused to spread inward from opposite directions.

Signed at Chicago, Illinois, July 31, 1916.

FRANK T. THOMPSON.

Witnesses:
HARRY IRWIN CROMER,
W. HARDING.